US006847682B2

(12) United States Patent
Liang

(10) Patent No.: US 6,847,682 B2
(45) Date of Patent: Jan. 25, 2005

(54) METHOD, SYSTEM, DEVICE AND COMPUTER PROGRAM PRODUCT FOR MPEG VARIABLE BIT RATE (VBR) VIDEO TRAFFIC CLASSIFICATION USING A NEAREST NEIGHBOR CLASSIFIER

(75) Inventor: Qilian Liang, San Diego, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 547 days.

(21) Appl. No.: 10/061,867

(22) Filed: Feb. 1, 2002

(65) Prior Publication Data

US 2003/0147466 A1 Aug. 7, 2003

(51) Int. Cl.⁷ .............................................. H04N 7/12
(52) U.S. Cl. ............................................... 375/240.12
(58) Field of Search ....................... 375/240.02, 240.03, 375/240.12, 240.13; 382/238, 239, 251, 254; 348/391.1, 395.1, 404.1, 419.1; H04N 7/12

(56) References Cited

U.S. PATENT DOCUMENTS

| 5,982,431 A | * | 11/1999 | Chung ................... 375/240.01 |
| 6,278,735 B1 | * | 8/2001 | Mohsenian ................. 375/240 |
| 6,400,831 B2 | * | 6/2002 | Lee et al. .................... 382/103 |
| 6,636,220 B1 | * | 10/2003 | Szeliski et al. ............. 345/475 |
| 6,754,389 B1 | * | 6/2004 | Dimitrova et al. .......... 382/224 |
| 6,760,478 B1 | * | 7/2004 | Adiletta et al. ............. 382/236 |
| 6,775,305 B1 | * | 8/2004 | Delvaux ...................... 370/535 |

OTHER PUBLICATIONS

Savazzi et al; "A Suboptimal Approach to Channel Equalization Based on the Nearest Neighbor Rule"; IEEE, vol. 16, No. 9, Dec.–1998; pp. 1640–1648.*

Pacifici et al; "Guest Editorial Real–Time Video Services in Multimedia Networks"; IEEE, vol. 15, No. 6, Aug.–1997; pp. 961–964.*

Manzoni et al; "Workload Models of VBR Video Traffic and Their Use in Resource Allocation Policies"; IEEE, vol. 7, No. 3, Jun. 1999; pp. 387–397.*

Pancha et al; "A look at the MPEG video coding standard for variable bit rate video transmission"; IEEE INFOCOM"92; pp. 95–94.*

Liang et al; "MPEG VBR Video Traffic Modeling and Classification Using Fuzzy Technique"; IEEE, vol. 9, No. 1, Feb.–2001; pp. 183–193.*

Krunz et al; "Statistical Characteristics and Multiplexing of MPEG Streans"; IEEE, 1995; pp. 455–462.*

Adas; "Using Adaptive Linear Prediction to Support Real–Time VBR Video Under RCBR Network Service Model"; IEEE, 1998; pp. 635–644.*

Dawood et al; "MPEG Video Modeling Based On Scene Description"; IEEE, 1999; pp. 351–355.*

Dawood et al; "Content–based MPEG Video Traffic Modeling"; IEEE, vol. 1, No. 1, Mar.–1999; pp. 77–87.*

Chang et al; "Optimal Nonlinear Adaptive Prediction and Modeling of MPEG Video in ATM Networks Using Pipelined Recurren Neutral Networks"; IEEE, vol. 15, No. 6, Aug.–1997; pp. 1087–1100.*

* cited by examiner

*Primary Examiner*—Nhon Diep
(74) *Attorney, Agent, or Firm*—John T. Whelan

(57) ABSTRACT

A method, system, device and computer program product for moving pictures experts group (MPEG) variable bit rate (VBR) video traffic classification using a nearest neighbor classifier, including determining I, P and B frame sizes for an input MPEG VBR video sequence; computing mean values of the I, P and B frame sizes; and classifying the input video sequence into one of a plurality of categories based on the computed mean values using a nearest neighbor classifier.

24 Claims, 6 Drawing Sheets

METHOD, SYSTEM, DEVICE AND COMPUTER PROGRAM PRODUCT FOR MPEG VARIABLE BIT RATE (VBR) VIDEO TRAFFIC CLASSIFICATION USING A NEAREST NEIGHBOR CLASSIFIER

BACKGROUND OF THE INVENTION

Field of the Invention

The present invention generally relates to video classification and more particularly to a method, system, device and computer program product for Moving Pictures Experts Group (MPEG) variable bit rate (VBR) video traffic classification using a nearest neighbor classifier. The present invention includes use of various technologies described in the references identified in the appended LIST OF REFERENCES and cross-referenced throughout the specification by numerals in brackets corresponding to the respective references, the entire contents of all of which are incorporated herein by reference.

DISCUSSION OF THE BACKGROUND

In recent years, among the various kinds of multimedia services, video service is becoming an important component. Video service refers to the transmission of moving images together with sound [13] and video applications are expected to be the major source of traffic in future broadband networks. Video applications, such as video on demand, automatic surveillance systems, video databases, industrial monitoring, video teleconferencing, etc., involve storage and processing of video data.

Many of such applications can benefit from retrieval of the video data based on the content thereof. However, any content retrieval model typically must have the capacity for dealing with massive amounts of data [5]. Digital video is often compressed by exploiting the inherent redundancies that are common in motion pictures. Accordingly, to classify the compressed (e.g., using MPEG) VBR video traffic directly without decompressing same typically will be an essential step for ensuring the effectiveness of such systems.

Most work on video sequence classification includes a content-based approach, which uses spatial knowledge obtained after decompressing a video sequence (see, e.g., [5] [18]). Research on VBR video classification is scarce, because: (1) VBR video is compressed code and very little information is available for classification (i.e., the only information that typically can be used is frame sizes of the VBR video); and (2) VBR video is highly bursty and exhibits uncertain behavior.

Patel and Sethi [14] proposed a decision tree classifier for video shot detection and characterization by examining the compressed video directly. For shot detection, such a method consists of comparing intensity, row and column histograms of successive I frames of MPEG video using the chi-square test. For characterization of segmented shots, such a method classified shot motion into different categories using a set of features derived from motion vectors of P and B frames of MPEG video.

Relatively more research exists for VBR video frames modeling and predicting than for classification. Dawood and Ghanbari [3] [4] used linguistic labels to model MPEG video and classified them into nine classes based on texture and motion complexity. Such a method used crisp values obtained from the mean values of training prototype video sequences to define low, medium, and high texture and motion.

Chang and Hu [2] investigated the applications of pipelined recurrent neural networks to MPEG video frames prediction and modeling. In such a technique, the I/P/B pictures were characterized by a general nonlinear Autoregressive Moving Average (ARMA) process. Pancha et al. [15] observed that a gamma distribution fits the statistical distribution of the packetized bits/frame of video with low bit rates. Heyman et al. [7] showed that the number of bits/frame distribution of I-frames has a lognormal distribution and its autocorrelation follows a geometrical function. Heyman et al. then concluded that there is no specific distribution that can fit P and B frames. Krunz et al. [8], however, found that the lognormal distribution is the best match for all three frame types and that because the video frame sizes follow some statistical distribution, it is possible to classify them. Recently, Liang and Mendel [10] proposed five fuzzy logic classifiers and one Bayesian classifier for MPEG VBR traffic classification and modeling.

However, the above-noted methods typically employ complex systems, such as fuzzy logic systems, neural network systems, etc., and complex models. Therefore, there is need for a method, system, device and computer program product for MPEG VBR traffic classification that is more robust and easier to implement than video traffic classification based on complex systems, such as fuzzy logic systems, neural network systems, etc., and complex models.

SUMMARY OF THE INVENTION

The above and other needs are addressed by the present invention, which provides an improved method, system, device and computer program product for moving pictures experts group (MPEG) variable bit rate (VBR) video traffic classification using a nearest neighbor classifier, which is more robust and easier to implement than MPEG VBR traffic classification based complex systems, such as fuzzy logic systems, neural network systems, etc., and complex models.

Accordingly, in one aspect of the present invention there is provided an improved method, system, device and computer program product for moving pictures experts group (MPEG) variable bit rate (VBR) video traffic classification using a nearest neighbor classifier, including determining I, P and B frame sizes for an input MPEG VBR video sequence; computing mean values of the I, P and B frame sizes; and classifying the input video sequence into one of a plurality of categories based on the computed mean values using a nearest neighbor classifier.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method, system, device and computer program product for moving pictures experts group (MPEG) variable bit rate (VBR) video traffic classification using a nearest neighbor classifier, are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Generally, the present invention employs a nearest neighbor classifier (e.g., three-dimensional) for classifying Moving Pictures Experts Group (MPEG) [21] variable bit rate (VBR) video traffic based on the I/P/B frame sizes. Simulation results show that (1) MPEG VBR video traffic can be classified based on the I/P/B frame sizes using a nearest neighbor classifier and such technique can achieve a quite low false alarm rate, as compared to other classifiers; and (2) the nearest neighbor classifier performs better than a Bayesian classifier (e.g., a Bayesian classifier based on the I/P/B frame sizes distribution proposed by Krunz et al. [8]), contrary to conventional wisdom, which holds that the Bayesian classifier is an optimal classifier.

Such an anomaly is investigated by re-evaluating a distribution for the I/P/B frame sizes of MPEG VBR video traffic. From such investigation, the present invention recognizes that a lognormal distribution, such as used in the Bayesian classifier, is not a good approximation in the MPEG VBR video traffic classification case. Because the Bayesian classifier is a model-based classifier (i.e., based on the lognormal distribution) and the nearest neighbor classifier is model free, the nearest neighbor classifier performs better than the Bayesian classifier in the MPEG VBR video traffic classification case.

Figure 1:
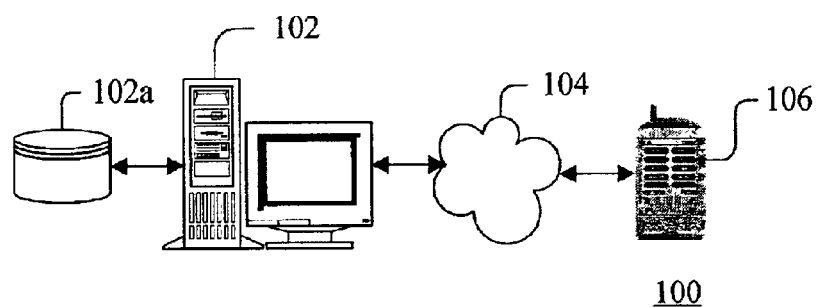
FIG. 1 is top level system diagram illustrating an exemplary communications system, which may employ a MPEG VBR video traffic nearest neighbor classifier, according to the present invention.

Referring now to the drawings, wherein like reference numerals designate identical or corresponding parts throughout the several views, and more particularly to FIG. 1 thereof, there is illustrated an exemplary communications system 100, in which MPEG VBR video traffic classification according to the present invention may be employed. In FIG. 1, the communications system 100 includes one or more data sources 102a coupled to a server 102. The server 102 is coupled via a communications network 104 (e.g., a Public Switched Telephone Network (PSTN), etc.) to a device 106. The MPEG VBR video traffic classification according to the present invention may be included in the server 102 and/or the device 106.

With the above-noted system 100, video on demand, automatic surveillance systems, video databases, industrial monitoring, video teleconferencing, etc., may be implemented via the devices 102 and 106 and the system 100. One or more interface mechanisms maybe used in the system 100, for example, including Internet access, telecommunications in any form (e.g., voice, modem, etc.), wireless communications media, etc., via the communication network 104. Information used in the system 100 also may be transmitted via direct mail, hard copy, telephony, etc., when appropriate.

Accordingly, the devices 102 and 106 of the system 100 of FIG. 1 may include any suitable servers, workstations, personal computers (PCs), laptop PCs, personal digital assistants (PDAs), Internet appliances, set top boxes, wireless devices, cellular devices, satellite devices, other devices, etc., capable of performing the processes of the present invention. The devices 102 and 106 of the system 100 of FIG. 1 may communicate with each other using any suitable protocol and, for example, via the communications network 104 and maybe implemented using the computer system 701 of FIG. 7, for example.

It is to be understood that the devices 102 and 106 in the systems 100 of FIG. 1 are for exemplary purposes only, as many variations of the specific hardware used to implement the present invention are possible, as will be appreciated by those skilled in the relevant art(s). For example, the functionality of the one or more of the devices 102 and 106 may be implemented via one or more programmed computers or devices. On the other hand, two or more programmed computers or devices, for example as in shown FIG. 7, may be substituted for any one of the devices 102 and 106. Principles and advantages of distributed processing, such as redundancy, replication, etc., may also be implemented as desired to increase the robustness and performance of the systems 100 of FIG. 1, for example.

The communications network 104 may be implemented via one or more communications networks (e.g., the Internet, an Intranet, a wireless communications network, a satellite communications network, a cellular communications network, a hybrid network, etc.), as will be appreciated by those skilled in the relevant art(s). In a preferred embodiment of the present invention, the communications network 104 and the devices 102 and 106 preferably use electrical signals, electromagnetic signals, optical signals, etc., that carry digital data streams, as are further described with respect to FIG. 7.

Figure 2:
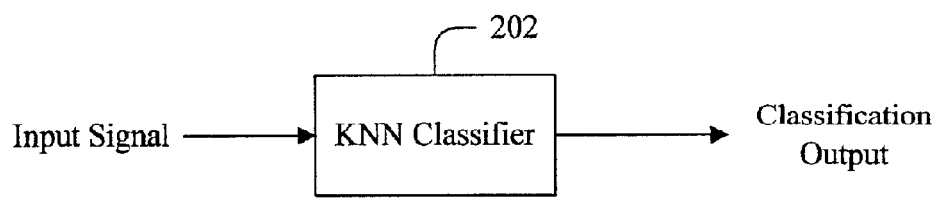
FIG. 2 is a block diagram illustrating the MPEG VBR video traffic nearest neighbor classifier, which may be employed in the system of FIG. 1, according to the present invention.

FIG. 2 is a block diagram illustrating a MPEG VBR video traffic K nearest neighbor classifier 202 (e.g., implemented via hardware and/or software), which may be employed in the system 100 of FIG. 1, according to the present invention. In FIG. 2, the nearest neighbor classifier 202 receives input signals (e.g., MPEG VBR video I, P, B frame sizes) and generates a classification result (e.g., sports, movies, etc.). The operation of the nearest neighbor classifier 202 according to the present invention will now be described in detail with reference to FIGS. 1–6.

The following section briefly introduces MPEG video. Then, I/P/B frame sizes are modeled using supervised clustering and a lognormal distribution of the I/P/B frame sizes is discussed. Thereafter, the nearest neighbor classifier 202 (e.g., three dimensional, K=3) according to the present invention is described and a three-dimension Bayesian classifier is reviewed. Next, the performance of the two classifiers is evaluated using, for example, two sets of experiments (e.g., in-product and out-of-product experiments). Finally, the reason why the Bayesian (i.e., optimal) classifier is not optimal in the MPEG VBR video traffic classification case is investigated. The MPEG variable bit rate (VBR) video traffic classification using a nearest neighbor classifier according to the present invention will now be described in detail in the following sections and with reference to FIGS. 1–8.

Introduction to MPEG Video

MPEG (Moving Picture Expert Group) is an ISO/IEC standard for digital video compression coding and has been extensively used to overcome a problem of storage of prerecorded video on digital storage media. This is due to the high compression ratios MPEG coding achieves. MPEG video is composed of a Group of Pictures (GoP) that include encoded frames: I (intracoded), P (predicted) and B (bidirectional).

The I frames are coded with respect to the current frame using a two-dimensional discrete cosine transform. The I frames have a relatively low compression ratio. The P frames are coded with reference to previous I or P frames using interframe coding. The P frames can achieve a better compression ratio than the I frames. The B frames are coded with reference to the next and previous I or P frames. The B frames can achieve the highest compression ratio of the three frame types.

Figure 3A:
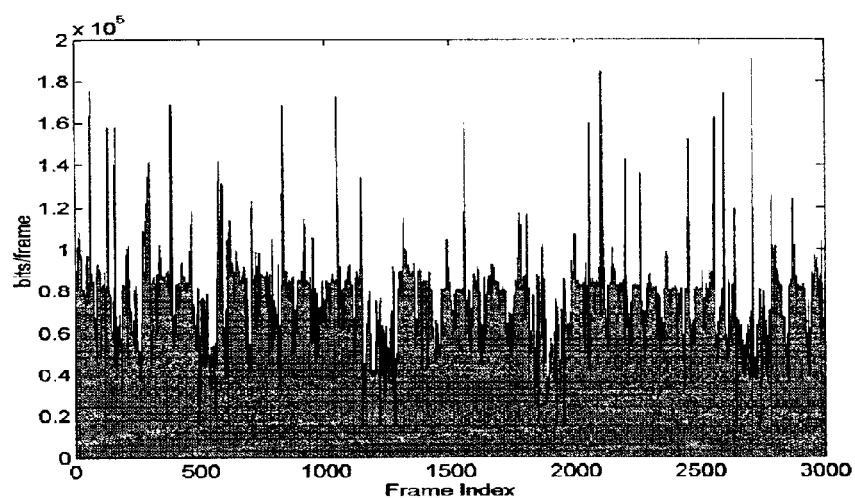
FIGS. 3(a)–3(c) are graphs illustrating portions of I/P/B frame sizes of ATP tennis final video, wherein (a) is the I frame, (b) is the P frame and (c) is the B frame.
Figure 3B:
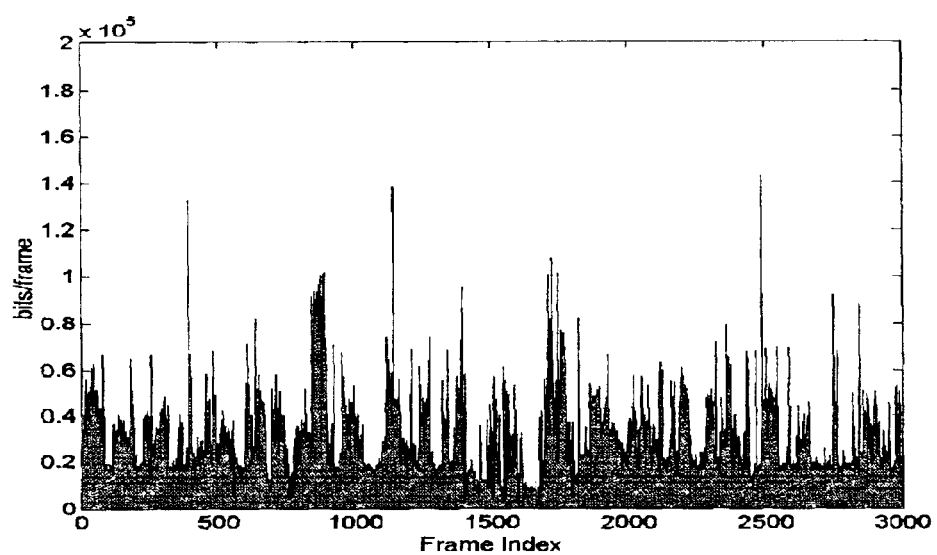
Figure 3C:
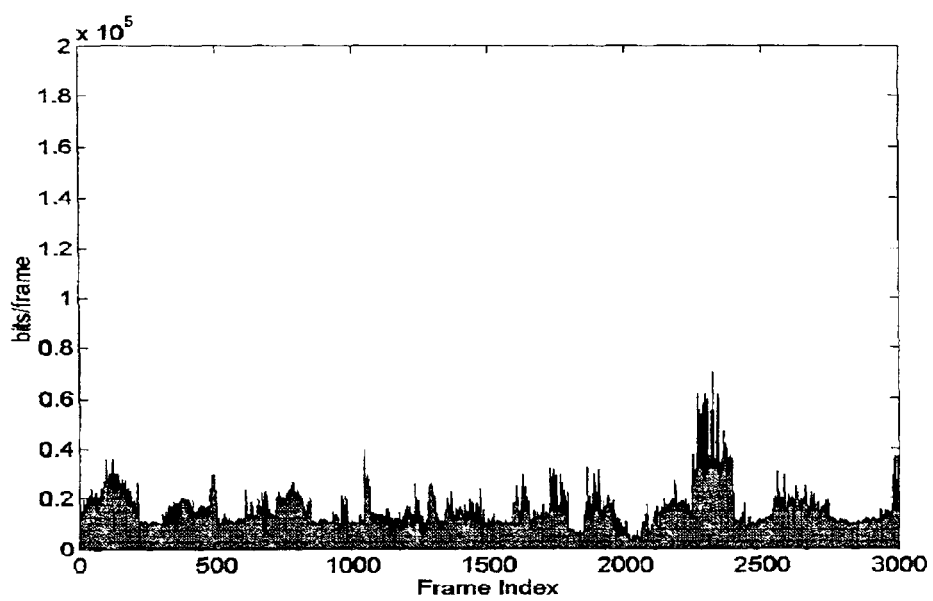

The sequence of frames is specified by two parameters, M, the distance between the I and P frames and N, the distance between the I frames. The use of these three types of frames allows MPEG to be both robust (i.e., the I frames permit error recovery) and efficient (i.e., the B and P frames have a high compression ratio). Variable bit-rate (VBR) MPEG video is used in Asynchronous Transfer Mode (ATM) [19] networks and constant bit-rate (CBR) MPEG video is often used in narrowband ISDN. The present invention may be employed with MPEG VBR video. In FIGS. 3(a)–3(c), plots of the I/P/B frame sizes, respectively, for 3000 frames of an MPEG coded video of ATP tennis final are shown.

Study on the Distribution of I/P/B Frame Sizes Using Supervised Clustering

Clustering of numerical data forms a basis for many classification and modeling algorithms. The purpose of clustering is to distill natural groupings of data from a large data set, producing a concise representation of a system's behavior. In the present invention, supervised clustering is employed because the I/P/B frame categories can be read from a header thereof. In the present invention, the time-index for each frame is ignored and the histograms of the I/P/B frame sizes are represented using three distributions, one each for the I, P and B frames. Because the I/P/B frames are mixed together in MPEG video, clustering is used to group the mixed frames into I, P or B clusters. The mean and standard deviation (std) of each cluster is then computed.

The present invention, for example, employs MPEG-1 video traces made available online [20] by Oliver Rose [16] of the University of Wurzburg. Numerous researchers have based their research on such MPEG-1 video traces. For example, Rose [16] analyzed statistical properties of such video traces and observed that the frame and GoP sizes can be approximated by Gamma or Lognormal distributions. Manzoni et al. [12] studied the workload models of VBR video based on such video traces. Adas [1] used adaptive linear prediction to forecast the VBR video for dynamic bandwidth allocation using such video traces.

The present invention, for example, employs ten of Rose's video traces and subdivides them into two categories, movies and sports, according to the subject of the video, i.e.,:

(i) Movies: (1) "Jurassic Park" (dino), (2) "The Silence of the Lambs" (lambs), (3) "Star Wars" (star), (4) "Terminator II" (term), and, (5) a 1994 movie preview (movie).

(ii) Sports: (6) ATP tennis final (atp), (7) formula 1 race: GP Hockenheim 1994 (race), (8) super bowl final 1995: San Diego-San Francisco (sbowl), two 1994 soccer world cup matches ((9) soc1 and (10) soc2).

The videos were compressed by Rose using an MPEG-1 encoder using a pattern, IBBPBBPBBPBB, with GoP size 12. Each MPEG video stream consisted of 40,000 video frames, which at 25 frames/sec represented about 30 minutes of real-time full motion video. FIGS. 3(a)–3(c) show portions of the I/P/B frame size sequences of the atp video.

Krunz et al. [8] found that the lognormal distribution is the best match for all I/P/B frames. That is, if the I, P or B frame size at time j is $s_j$, then:

$$\log_{10} s_j \sim N(\cdot; m, \sigma^2) \quad (1)$$

Since the log-value of video frame sizes follows a Gaussian distribution, it is possible to classify the I/P/B frames using a Bayesian classifier. The performance of the nearest neighbor classifier 202 of the present invention then is compared with the performance of the Bayesian classifier.

Nearest Neighbor Classifier and Bayesian Classifier for Video Classification

The present invention employs some video frames for training (i.e., the video category, movie or sports, is known in advance) and the remaining video frames for testing (i.e., to classify a category of the frames).

Nearest Neighbor Classifier

The nearest-neighbor (NN) rule and an extension thereof, the K-NN algorithm [6] (if the number of training prototypes is N, then K=√N is the optimal choice for K), are nonparametric classification algorithms. These algorithms have been extensively applied to many pattern recognition problems. For example, recently, Savazzi, et al. [17] applied a nearest neighbor classifier, which used the K-NN algorithm to channel equalization for mobile radio communications and achieved good performance. The nearest neighbor classifier 202 of the present invention is based on a three-dimension Euclidean distance between the mean of the I, P and B frame sizes, $m_i^I$, $m_i^P$ and $m_i^B$, in the training data set and the mean of the I, P, and B frame sizes, $m^t=[m_I^t, m_P^t, m_B^t]$, in the testing data set, given by:

$$d_i = \sqrt{(m_{I^t} - m_i^I)^2 + (m_{P^t} - m_i^P)^2 + (m_{B^t} - m_i^B)^2} \quad (2)$$

The K nearest neighbors then are chosen based on $d_i$ (i=1, 2, ..., N), and the classification decision is made based on the majority category of the K neighbors.

Bayesian Classifier: An Overview

Bayesian decision theory [6] provides an optimal solution to a general decision-making problem. Liang and Mendel [10] proposed a Bayesian classifier for MPEG VBR video traffic classification. Such a classifier is now described.

It is assumed that each video product $v_i$, is equiprobable, i.e., $p(v_i)=1/N$ (i.e., N is the number of video products for training), where $i \in \{1, 2, \ldots, N\}$ (e.g., i=1 corresponds to the movie Jurassic Park in this paper). Let $H_1$: movie and $H_2$: sports, so that $p(H_1)=p(H_2)=0.5$ (i.e., the number of movie products equals to the number of sports products in training). If each component of the frame size, s +e,dus $\Delta[S^I, S^P, S^B]^T$ is a lognormal function [8] of the I, P and B frames of the ith video product, i=1, ..., N, and x +e,dus $\Delta$ logs, then:

$$p(x|v_i) = \frac{1}{(2\pi)^{3/2}|\Sigma_i|^{1/2}} \exp\left[-\frac{1}{2}(x-m_i)^T \sum_i^{-1}(x-m_i)\right] \quad (3)$$

where $m_i$+e,dus $\Delta[m_i^I, m_i^P, m_i^B]^T$ and $$\sum_i = diag\{\sigma_i^{I2}, \sigma_i^{P2}, \sigma_i^{B2}\}$$

are the mean vector (3×1) and covariance matrix (3×3) of $x_i$. In this case:

$$p(x|H_1) = \sum_{i=1}^{N/2} p(x|v_i)p(v_i) \quad (4)$$

$$p(x|H_2) = \sum_{i=N/2+1}^{N} p(x|v_i)p(v_i) \quad (5)$$

Based on Bayes decision theory, since $p(H_1)=p(H_2)=0.5$, a decision rule is obtained, as follows:

The video is movie if $p(x|H_1)>p(x|H_2)$ (6)

The video is sports if $p(x|H_1)<p(x|H_2)$ (7)

Simulations

Two sets of simulations were performed, one set of simulations for in-product classification (i.e., the training frames are taken from the first half of the 10 video products and remaining parts of the 10 video products are for testing); and the other set of simulations for out-of-product classification (i.e., the training frames are from 8 video products and frames from remaining two video products are for testing). To minimize the randomness of the results and to make the Bayesian classifier and the nearest neighbor classifier 202 practical, the testing frames are split into numerous small units (e.g., 240 frames/unit). Such small units then are classified independently. Each classifier classifies one small unit as movie or sports. If a classifier classifies one unit incorrectly, then it gives a false alarm. At the end of such simulations, the average false alarm rate (FAR) for each classifier is obtained.

In-Product Classification

For the 10 video products chosen, the first 24,000 frames thereof are used for supervised clustering to establish the parameters in the Bayesian classifier and the nearest neighbor classifier 202 for that video product.

To evaluate the performance of the two classifiers, the next 15,000 (24,001–39,000) frames are used for in-product testing (i.e., for classifying a video as a movie or sport). A small number of frames as one unit, L frame/units, are chosen. Every unit is tested for each video product independently. Every unit is tested, with 15,000/L independent evaluations for each video product, so that both classifiers are evaluated a total of 10×15000/L times. The average and standard deviation (std) of the FARs of the two classifiers for such a number of classifications is computed. During each testing session, supervised clustering is used to obtain the mean $m^r=[m_I^r, m_P^r, m_B^r]$ of the I/P/B frames for the test unit (L frames).

For the Bayesian classifier, N=10 in such experiments. It is observed from equation (3) that the Bayesian classifier employs $m_i=[m_i^I, m_i^P, m_i^B]^T$ and $\Sigma_i=diag\{\sigma_i^{I2}, \sigma_i^{P2}, \sigma_i^{B2}\}$ (i=1, 2, ..., 10). In the present invention, $m_i^I$ and $\sigma_i^I$ are the mean and std of all the I frames in the first 24,000 frames of video product i; $m_i^P$ and $\sigma_i^P$ are the mean and std of all the P frames in the first 24,000 frames of video product i; $m_i^B$ and $\sigma_i^B$ are the mean and std of all the B frames in the first 24,000 frames of video product i; and x +e,dus $\Delta$ $m^r$. Equations (3), (6) and (7) are then applied to classify the test unit (L frames).

For the nearest neighbor classifier 202, there are N=10 video products for training, so K=3 ($\sqrt{N}\approx 3$) is chosen. The nearest neighbor classifier 202 employs $m_i=[m_i^I, m_i^P, m_i^B]^T$, which can be obtained using a same computation as that for the Bayesian classifier. However, $\Sigma_i$ is not needed for the nearest neighbor classifier 202. Equation (2) is then applied to compute the Euclidean distance and a classification decision is made based on the categories of the three nearest neighbors.

Figure 4A:
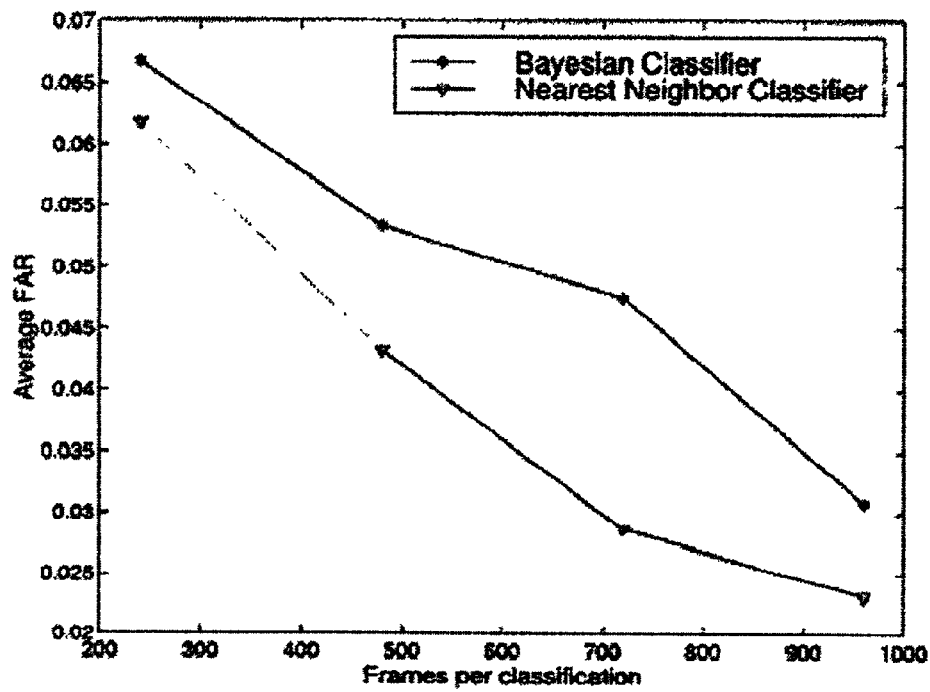
FIGS. 4(a)–4(b) are graphs illustrating the performance of a Bayesian classifier and the nearest neighbor classifier according to the present invention in an in-product experiment, wherein (a) is the average FAR and (b) is the std of FAR.

The simulations are run for different values of L, L=240, 480, 720 and 960, respectively. For each value, the average false alarm rate (FAR) and the standard deviation (std) of FARs is computed. In FIG. 4(a), a plot of the average FAR versus the number of frames (L) is shown. From FIG. 4(a) it is observed that both classifiers achieve a very low FAR, but the nearest neighbor classifier 202 performs better than the Bayesian classifier over the entire test range.

Figure 4B:
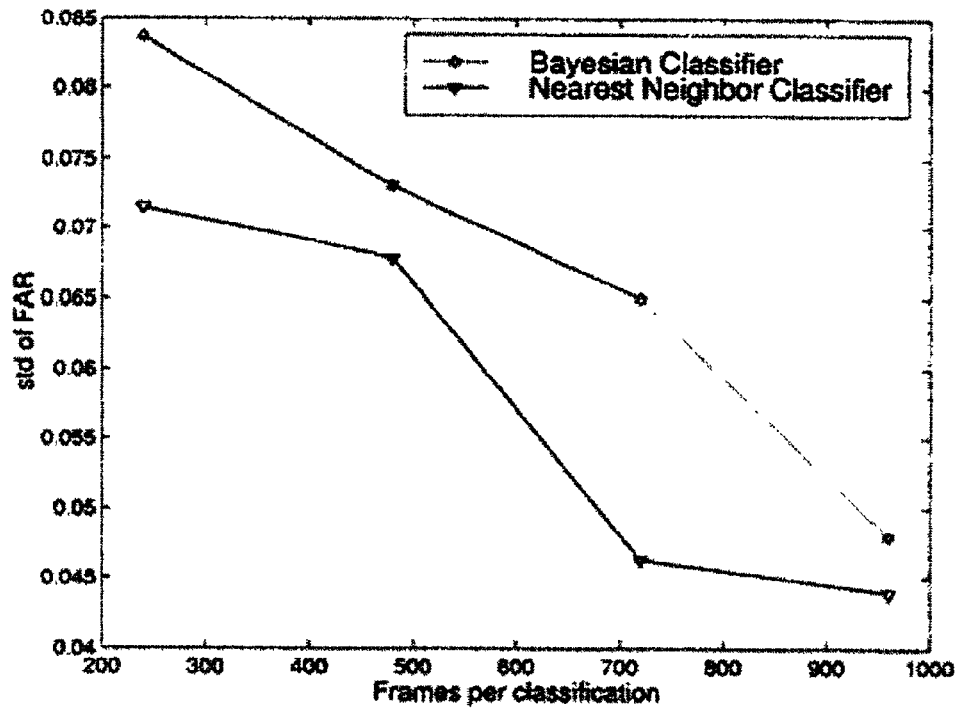
Figure 5A:
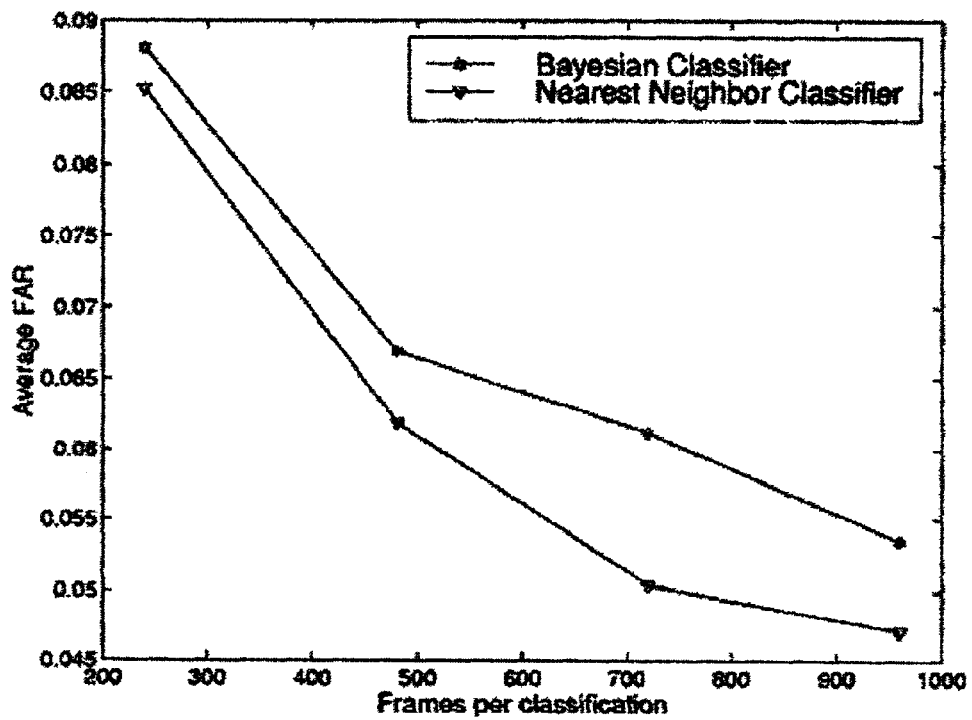
FIGS. 5(a)–5(b) are graphs illustrating the performance of a Bayesian classifier and the nearest neighbor classifier according to the present invention in an out-of-product experiment, wherein (a) is the average FAR, and (b) is the std of FAR.
Figure 5B:
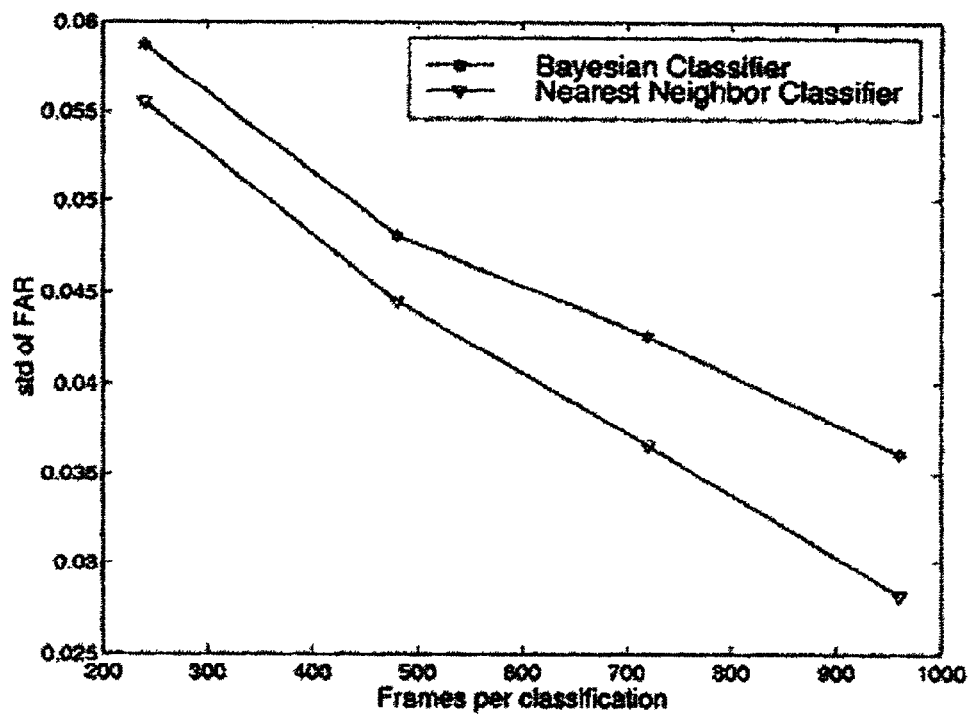

In FIG. 4(b), the std of the FARs is plotted. From FIG. 4(b) it is observed that the std of the FARs from nearest neighbor classifier 202 is lower than that from the Bayesian classifier. These observations go against conventional wisdom because the Bayesian classifier is recognized as an optimal classifier. It is later investigated how the nearest neighbor classifier 202, as observed from FIGS. 4(a) and 4(b), performs better than the Bayesian classifier in MPEG VBR video classification.

Out-of-Product Classification

The out-of-product classification is performed to examine the robustness of the classifiers. The classifiers are designed using eight video portions, four from video products 1–5 (movies) and 4 from video products 6–10 (sports). The performance of the classifiers is then tested using the two unused video products, 1 from video products 1–5, and 1 from video products 6–10. Accordingly, a total of 25 independent combinations are employed (i.e., 8 video products for training plus 2 video products for out-of-product testing).

The first 24,000 frames of each of the 8 training video products are used to establish the parameters for both classifiers (N=8) for that video product using the methods described previously. For the nearest neighbor classifier 202, K=3 ($\sqrt{N}\approx 3$) is chosen. The performance of the two classifiers then is evaluated using the first 39,000 frames of the two out-of-product testing videos (i.e., for classifying a video as a movie or sport). A different number of frames is chosen as one unit, L frames/unit.

Every unit is tested with 39000/L independent evaluations for each video product, so that the two classifiers are evaluated a total of 25×2×39000/L times. The average FAR and std of FARs next is computed for the two classifiers for such a large number of classifications. The simulations are run for L=240, 480, 720 and 960 and the results are plotted in FIGS. 5(a) and 5(b). From FIGS. 5(a) and 5(b), it is observed that both classifiers are robust (i.e., the average FARs are very low), but the nearest neighbor classifier 202 still performs better than the Bayesian classifier.

Why "Optimal" Classifier is not Optimal

As noted in [11], a shortcoming to model-based statistical signal processing is " . . . the assumed probability model, for which model-based statistical signal processing results will be good if the data agrees with the model, but may not be so good if the data does not." In variable bit rate (VBR) MPEG video, the video frame sizes are highly bursty and it is believed that no statistical model can truly characterize the uncertain nature of the I/P/B frames.

Accordingly, the logarithm of the frame size was attempted to be modeled to see if a Gaussian distribution could match characteristics thereof. The lambs and sbowl videos are chosen as examples. For each MPEG-1 video, the I/P/B frames are decomposed into eight segments and the mean, $m_i$, and std, $\sigma_i$, of the logarithm of the frame size of the ith segment, i=1, 2, . . . , 8 are computed. The mean, m, and std, $\sigma$, of the entire video frames in a video product are also computed. To see which value—$m_i$ or $\sigma_i$—varies more, the mean and std of each segment is normalized using $m_i/m$ and $\sigma_i/\sigma$. The std of the normalized values, $\sigma_m$ and $\sigma_{std}$, are then computed. As seen from the last row of Tables 1 and 2 below, $\sigma_m << \sigma_{std}$.

TABLE 1

Mean and standard deviation (std) values for 8 segments and the entire lambs video traffic, and their normalized std.

| | I Frame | | P Frame | | B Frame | |
|---|---|---|---|---|---|---|
| Video Data | mean | std | mean | std | mean | std |
| Segment 1 | 4.6478 | 0.1143 | 3.7710 | 0.3643 | 3.5080 | 0.2669 |
| Segment 2 | 4.5563 | 0.1032 | 3.8098 | 0.3547 | 3.4643 | 0.3058 |
| Segment 3 | 4.4990 | 0.0388 | 3.3314 | 0.3065 | 3.1011 | 0.2144 |
| Segment 4 | 4.5087 | 0.0657 | 3.4899 | 0.3043 | 3.2489 | 0.2231 |
| Segment 5 | 4.6538 | 0.1664 | 3.9747 | 0.3943 | 3.6660 | 0.3490 |
| Segment 6 | 4.5407 | 0.1496 | 3.8511 | 0.3488 | 3.5359 | 0.3011 |
| Segment 7 | 4.4739 | 0.1334 | 3.5128 | 0.3754 | 3.2645 | 0.3209 |
| Segment 8 | 4.5907 | 0.1087 | 3.7445 | 0.2345 | 3.4798 | 0.1694 |
| Entire Traffic | 4.5589 | 0.1326 | 3.6857 | 0.3950 | 3.4085 | 0.3251 |
| Normalized std | 0.0147 | 0.3173 | 0.0590 | 0.1300 | 0.0545 | 0.1892 |

TABLE 2

Mean and standard deviation (std) values for 8 segments and the entire sbowl video traffic, and their normalized std.

| | I Frame | | P Frame | | B Frame | |
|---|---|---|---|---|---|---|
| Video Data | mean | std | mean | std | mean | std |
| Segment 1 | 4.8438 | 0.1032 | 4.4446 | 0.1953 | 4.1446 | 0.1678 |
| Segment 2 | 4.7316 | 0.1735 | 4.2410 | 0.3480 | 3.9324 | 0.3665 |
| Segment 3 | 4.8187 | 0.1272 | 4.4468 | 0.2916 | 4.1187 | 0.2404 |
| Segment 4 | 4.8544 | 0.0918 | 4.5515 | 0.1778 | 4.2184 | 0.1769 |
| Segment 5 | 4.8008 | 0.1001 | 4.4556 | 0.2151 | 4.1283 | 0.1971 |
| Segment 6 | 4.8297 | 0.0888 | 4.4862 | 0.1700 | 4.1778 | 0.1700 |
| Segment 7 | 4.8545 | 0.1140 | 4.5015 | 0.1770 | 4.1701 | 0.1728 |
| Segment 8 | 4.7803 | 0.1557 | 4.3426 | 0.2920 | 4.0372 | 0.3148 |
| Entire Traffic | 4.8141 | 0.1292 | 4.4337 | 0.2585 | 4.1159 | 0.2515 |
| Normalized std | 0.0088 | 0.2390 | 0.0221 | 0.2616 | 0.0221 | 0.3021 |

From Tables 1 and 2 it is concluded that if the I/P/B frames of each segment (i.e., short range) of the MPEG video are lognormally distributed, then the logarithm of the I, P or B frame sizes in an entire video (i.e., long range) is more appropriately modeled as a Gaussian distribution with uncertain standard deviation, which is non-stationary. It is believed that the statistical knowledge (i.e., mean and std) about the size (bits/frame) of I, P or B clusters is distinct for different groups of frames, even in the same video product.

In contrast, the nearest neighbor classifier 202 is model free, being based on Euclidean distance and not being based on statistical distributions. That is why nearest neighbor classifier 202 may perform better than the "optimal" classifier, the Bayesian classifier. Unless a more appropriate statistical model can be proposed for the I/P/B frame sizes, the nearest neighbor classifier typically should perform better than any model-based classifier. The two classifiers also provide a criterion to verify any new distribution model for I/P/B frame sizes. That is, if the nearest neighbor classifier 202 performs better than the Bayesian classifier based on a new distribution model, then this means that the new distribution model is not an appropriate or ideal model.

Figure 6:
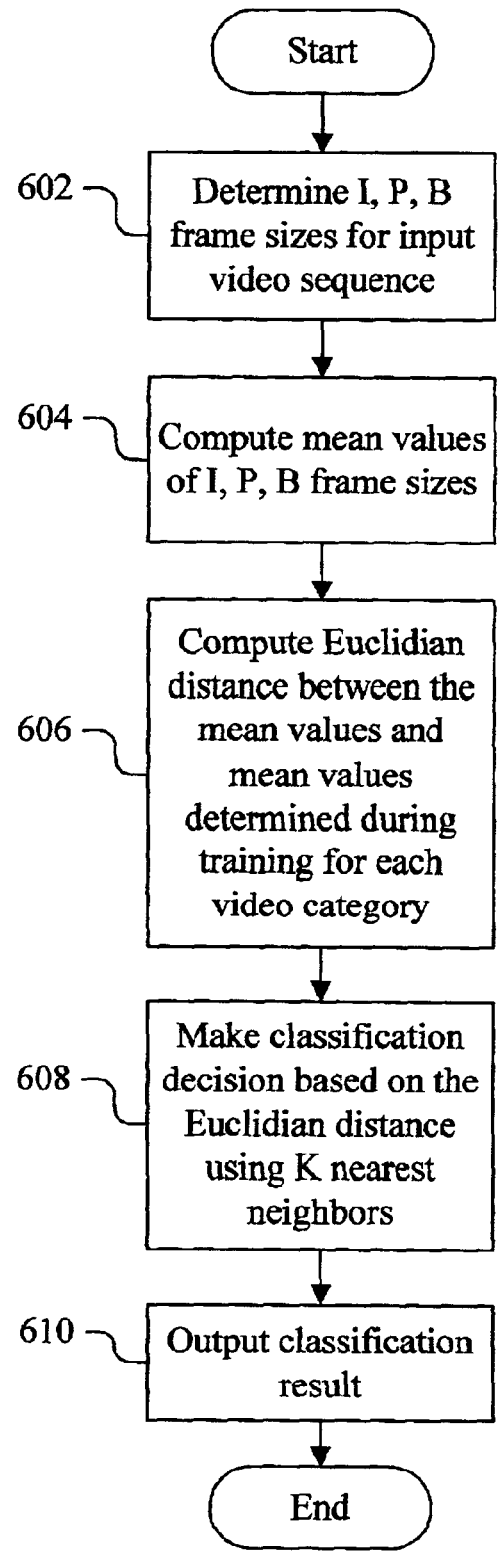
FIG. 6 is a flow chart illustrating the operation of the MPEG VBR video traffic nearest neighbor classifier, according to the present invention.

FIG. 6 is a flow chart illustrating the operation of the nearest neighbor classifier 202, according to the present invention. In FIG. 6, at step 602, the I, P and B frame sizes for an input MPEG VBR video sequence are determined, as previously described. At step 604, the mean values of the I, P, and B frame sizes, $m'=[m_I{}', m_P{}', m_B{}']$, for the input video sequence are computed. At step 606, the Euclidean distance is computed between the mean of the I, P and B frame sizes, $m_i{}^I$, $m_i{}^P$ and $m_i{}^B$, of the training video sequences and the mean of the I, P, and B frame sizes, $m'=[m_I{}', m_P{}', m_B{}']$, of the input video sequence, as previously described. At step 608, the nearest neighbor classifier 202 makes a classification decision (e.g., the input video sequence belongs to the category movies or sports) using the computed Euclidean distance and based on the K (e.g., K=3) nearest neighbors, as previously described. At step 610, the nearest neighbor classifier 202 outputs the classification result (e.g., movies or sports), as previously described, completing classification the process.

The present invention stores information relating to various processes described herein. This information is stored in one or more memories, such as a hard disk, optical disk, magneto-optical disk, RAM, etc. One or more databases, such as the databases within the devices 102 and 106 of the system 100 of FIG. 1, etc., may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 7, for example.

The previously described processes include appropriate data structures for storing data collected and/or generated by the processes of the system 100 of FIG. 1 in one or more databases thereof. Such data structures accordingly will includes fields for storing such collected and/or generated data. In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

The present invention (e.g., as described with respect to FIGS. 1–6) may be implemented by the preparation of application-specific integrated circuits or by interconnecting an appropriate network of conventional component circuits, as will be appreciated by those skilled in the electrical art(s). In addition, all or a portion of the invention (e.g., as described with respect to FIGS. 1–6) may be conveniently implemented using one or more conventional general purpose computers, microprocessors, digital signal processors, micro-controllers, etc., programmed according to the teachings of the present invention (e.g., using the computer system of FIG. 7), as will be appreciated by those skilled in the computer and software art(s). Appropriate software can be readily prepared by programmers of ordinary skill based on the teachings of the present disclosure, as will be appreciated by those skilled in the software art. Further, the present invention may be implemented on the World Wide Web (e.g., using the computer system of FIG. 7).

Figure 7:
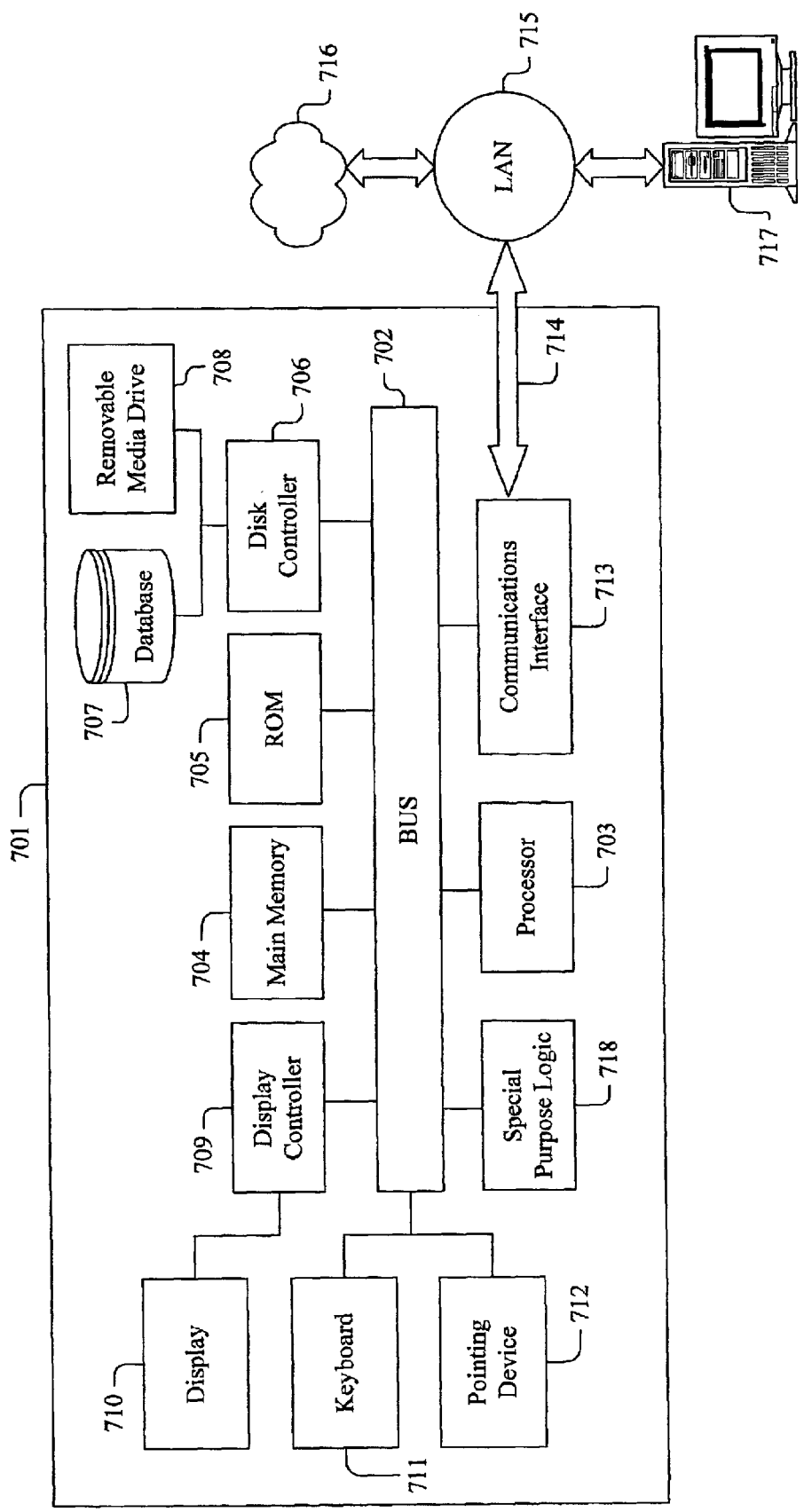
FIG. 7 is an exemplary computer system, which may be programmed to perform one or more of the processes of the present invention.

FIG. 7 illustrates a computer system 701 upon which the present invention (e.g., the devices 102 and 106 of the system 100 of FIG. 1, etc.) can be implemented. The present invention may be implemented on a single such computer system, or a collection of multiple such computer systems. The computer system 701 includes a bus 702 or other communication mechanism for communicating information, and a processor 703 coupled to the bus 702 for processing the information. The computer system 701 also includes a main memory 704, such as a random access memory (RAM), other dynamic storage device (e.g., dynamic RAM (DRAM), static RAM (SRAM), synchronous DRAM (SDRAM)), etc., coupled to the bus 702 for storing information and instructions to be executed by the processor 703. In addition, the main memory 704 can also be used for storing temporary variables or other intermediate information during the execution of instructions by the processor 703. The computer system 701 further includes a read only memory (ROM) 705 or other static storage device (e.g., programmable ROM (PROM), erasable PROM (EPROM), electrically erasable PROM (EEPROM), etc.) coupled to the bus 702 for storing static information and instructions.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices 718, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, communications transceiver functions, the nearest neighbor classifier 202 functions, etc.

The computer system 701 may also include a display controller 709 coupled to the bus 702 to control a display 710, such as a cathode ray tube (CRT), liquid crystal display (LCD), active matrix display, plasma display, touch display, etc., for displaying or conveying information to a computer user. The computer system includes input devices, such as a keyboard 711 including alphanumeric and other keys and a pointing device 712, for interacting with a computer user and providing information to the processor 703. The pointing device 712, for example, may be a mouse, a trackball, a pointing stick, etc., or voice recognition processor, etc., for communicating direction information and command selections to the processor 703 and for controlling cursor movement on the display 710. In addition, a printer may provide printed listings of the data structures/information of the system shown in FIGS. 1–8, or any other data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. Execution of the arrangement of instructions contained in the main memory 704 causes the processor 703 to perform the process steps described herein. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

Stored on any one or on a combination of computer readable media, the present invention includes software for controlling the computer system 701, for driving a device or devices for implementing the invention, and for enabling the computer system 701 to interact with a human user (e.g., users of the device 102 and 106 of the system 100 of FIG. 1, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a digital subscriber line (DSL) card or modem, an integrated services digital network (ISDN) card, a cable modem, a telephone modem, etc., to provide a data communication connection to a corresponding type of telephone line. As another example, communication interface 713 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 713 sends and receives electrical, electromagnetic, or optical signals that carry digital data streams representing various types of information. Further, the communication interface 713 can include peripheral interface devices, such as a Universal Serial Bus (USB) interface, a PCMCIA (Personal Computer Memory Card International Association) interface, etc.

The network link 714 typically provides data communication through one or more networks to other data devices. For example, the network link 714 may provide a connection through local area network (LAN) 715 to a host computer 717, which has connectivity to a network 716 (e.g. a wide area network (WAN) or the global packet data communication network now commonly referred to as the "Internet") or to data equipment operated by service provider. The local network 715 and network 716 both use electrical, electromagnetic, or optical signals to convey information and instructions. The signals through the various networks and the signals on network link 714 and through communication interface 713, which communicate digital data with computer system 701, are exemplary forms of carrier waves bearing the information and instructions.

The computer system 701 can send messages and receive data, including program code, through the network(s), network link 714, and communication interface 713. In the Internet example, a server (not shown) might transmit requested code belonging to an application program for implementing an embodiment of the present invention through the network 716, LAN 715 and communication interface 713. The processor 703 may execute the transmitted code while being received and/or store the code in storage devices 707 or 708, or other non-volatile storage for later execution. In this manner, computer system 701 may obtain application code in the form of a carrier wave. With the system of FIG. 7, the present invention may be implemented on the Internet as a Web Server 701 performing one or more of the processes according to the present invention for one or more computers coupled to the Web server 701 through the network 716 coupled to the network link 714.

The term "computer readable medium" as used herein refers to any medium that participates in providing instructions to the processor 703 for execution. Such a medium may take many forms, including but not limited to, non-volatile media, volatile media, transmission media, etc. Non-volatile media include, for example, optical or magnetic disks, magneto-optical disks, etc., such as the hard disk 707 or the removable media drive 708. Volatile media include dynamic memory, etc., such as the main memory 704. Transmission media include coaxial cables, copper wire, fiber optics, including the wires that make up the bus 702. Transmission media can also take the form of acoustic, optical, or electromagnetic waves, such as those generated during radio frequency (RF) and infrared (IR) data communications. As stated above, the computer system 701 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 715 and 716. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Recapitulating, the present invention employs, for example, a three-dimension (K=3) nearest neighbor classifier 202 for MPEG VBR video based on the I/P/B frame sizes. The simulation results show that (1) MPEG VBR video can be classified based on the I/P/B frame sizes only using the nearest neighbor classifier 202 and a Bayesian classifier and both classifiers can achieve a quite low false alarm rate; and (2) the nearest neighbor classifier 202 performs better than the Bayesian classifier, which is contrary to conventional logic because a Bayesian classifier is recognized as an optimal classifier.

This problem is investigated via reevaluation of the recognized lognormal distribution for the I/P/B frame sizes of MPEG video. It is then observed that the lognormal distribution is not such a good approximation. It is also observed that for MPEG VBR video, a lognormal distribution with uncertain variance is appropriate for modeling the I/P/B frame sizes.

However, it is believed the frame sizes of MPEG video are not really wide-sense stationary (WSS) and that their distribution varies with respect to the frame index. The Bayesian classifier is a model-based (i.e., based on the lognormal distribution in this invention) classifier, and nearest neighbor classifier 202 is model free. Accordingly, the nearest neighbor classifier 202 can perform better than the Bayesian classifier. A video product is classified as a movie or sport, which is essentially a binary detection problem.

However, classifying a video product in a larger domain (e.g., with 4 possible choices), while maintaining a low FAR may be possible using the techniques described in the present invention.

As digitization and encoding of video become more affordable, computer and Web data-based-systems are starting to store voluminous amount of video data. The nearest neighbor classifier 202 of the present invention can directly classify compressed video without decoding and provide an intelligent tool that helps people to efficiently access video information from multimedia services. For example, due to the limited bandwidth and buffer length in an ATM [19] network, processing compressed video translated to higher utilization of the network resources.

According to Kung and Hwang [9], "The technology frontier of information processing is shifting from coding (MPEG-1, MPEG-2, and MPEG-4) to automatic recognition—a trend precipitated by a new member of the MPEG family, MPEG-7, which focuses on multimedia content description interface. Its research domain will cover techniques for object-based tracking/segmentation, pattern detection/recognition, content-based indexing and retrieval, and fusion of multimodal signals." The nearest neighbor classifier 202 of the present invention is directed in the spirit of these new directions.

While the present invention has been described in connection with a number of embodiments and implementations, the present invention is not so limited but rather covers various modifications and equivalent arrangements, which fall within the purview of the appended claims.

List of References

References

[1] A. M. Adas, "Using adaptive linear prediction to support real-time VBR video under RCBR network service model," *IEEE Trans. on Networking*, vol. 6, no. 5, pp. 635–644, October 1998.

[2] P.-R. Chang and J.-T. Hu, "Optimal nonlinear adaptive prediction and modeling of MPEG video in ATM networks using pipelined recurrent neural networks," *IEEE J. of Selected Areas in Communications*, vol. 15, no. 6, pp. 1087–1100, August 1997.

[3] A. M. Dawood and M. Ghanbari, "MPEG video modeling based on scene description," *IEEE Int'l. Conf. Image Processing*, vol. 2, pp. 351–355, Chicago, Ill. October 1998.

[4] A. M. Dawood and M. Ghanbari, "Content-based MPEG video traffic modeling," *IEEE Trans. on Multimedia*, vol. 1, no. 1, pp. 77–87, March 1999.

[5] N. Dimitrova and F. Golshani, "Motion recovery for video content classification," *ACM Trans. Information Systems*, vol. 13, no. 4, October 1995, pp. 408–439.

[6] R. O. Duda and P. E. Hart, "Pattern Classification and Scene Analysis," John Wiley & Sons, Inc, USA, 1973.

[7] D. P. Heyman, A. Tabatabi, and T. V. Lakshman, "Statistical analysis of MPEG-2 coded VBR video traffic," *6th Int'l Workshop on Packet Video*, Portland, Oreg., September 1994.

[8] M. Krunz, R. Sass, and H. Hughes, "Statistical characteristics and multiplexing of MPEG streams," *Proc. IEEE Int'l Conf. Computer Communications*, INFOCOM'95, Boston, Mass., April 1995, vol. 2, pp. 455–462.

[9] S.-Y. Kung and J.-N. Hwang, "Neural networks for intelligent multimedia processing," *Proc. of the IEEE*, vol. 86, no. 6, pp. 1244–1272, June 1998.

[10] Q. Liang and J. M. Mendel, "MPEG VBR video traffic modeling and classification using fuzzy techniques," *IEEE Trans. Fuzzy Systems*, vol. 9, no. 1, pp. 183–193, February 2001.

[11] J. M. Mendel, "Uncertainty, fuzzy logic, and signal processing," *Signal Processing*, vol. 80, no. 6, pp. 913–933, June 2000.

[12] P. Manzoni, P. Cremonesi, and G. Serazzi, "Workload models of VBR video traffic and their use in resource allocation policies," *IEEE Trans. on Networking*, vol. 7, no. 3, pp. 387–397, June 1999.

[13] G. Pacifici, G. Karlsson, M. Garrett, and N. Ohta, "Guest editorial real-time video services in multimedia networks," *IEEE J. of Selected Areas in Communications*, vol. 15, no. 6, pp. 961–964, August 1997.

[14] N. Patel and I. K. Sethi, "Video shot detection and characterization for video databases," *Pattern Recognition*, vol. 30, no. 4, pp. 583–592, 1997.

[15] P. Pancha and M. El-Zarki, "A look at the MPEG video coding standard for variable bit rate video transmission," *IEEE INFOCOM'92*, Florence, Italy, 1992.

[16] O. Rose, "Statistical properties of MPEG video traffic and their impact on traffic modeling in ATM systems," University of Wurzburg, Institute of Computer Science, Research Report 101, February 1995.

[17] P. Savazzi, L. Favalli, E. Costamagna, and A. Mecocci, "A suboptimal approach to channel equalization based on the nearest neighbor rule," *IEEE J. Selected Areas in Communications*, vol. 16, no. 9, pp. 1640–1648, December 1998.

[18] R. Zabih, J. Miller, and K. Mai, "A feature-based algorithm for detecting and classifying production effects," *Multimedia Systems*, vol. 7, pp. 119–128, 1999.

[19] A network technology, for both local and wide area networks (LANs and WANs), that supports real-time voice and video as well as data. The topology uses switches that establish a logical circuit from end to end, which guarantees quality of service (QoS). However, unlike telephone switches that dedicate circuits end to end, unused bandwidth in ATM's logical circuits can be appropriated when needed. For example, idle bandwidth in a videoconference circuit can be used to transfer data.

[20] Available on the World Wide Web at <http://nero.informatik.uniwuerzburg.de/MPEG/traces/> as of Dec. 18, 2001.

[21] An ISO/ITU standard for compressing video. MPEG is a lossy compression method, which means that some of the original image is lost during the compression stage, which cannot be recreated. MPEG-1, which is used in CD-ROMs and Video CDs, provides a resolution of 352× 288 at 30 fps with 24-bit color and CD-quality sound. Most MPEG boards also provide hardware scaling that boosts the image to full screen. MPEG-1 requires 1.5 Mbps bandwidth. MPEG-2 supports a wide variety of audio/video formats, including legacy TV, HDTV and five channel surround sound. It provides the broadcast-quality image of 720×480 resolution that is used in DVD movies. MPEG-2 requires from 4 to 15 Mbps bandwidth. MPEG-3 never came to fruition. MPEG-4 is the next-generation MPEG that goes far beyond compression methods. Instead of treating the data as continuous streams, MPEG-4 deals with audio/video objects (AVOs) that can be manipulated independently, allowing for interaction with the coded data and providing considerably more flexibility in editing. MPEG-4 supports a wide range of audio and video modes and transmission speeds. It also deals with intellectual property (IP) and protection issues. For the best playback, MPEG-encoded material requires an MPEG board, and the decoding is done in the board's hardware. It is expected that MPEG circuits will be built into future computers. If the computer is fast enough (400 MHz Pentium, PowerPC, etc.), the CPU can decompress the material using software, providing other intensive applications are not running simultaneously. MPEG uses the same intraframe coding as JPEG for individual frames, but also uses interframe coding, which further compresses the video data by encoding only the differences between periodic key frames, known as I-frames. A variation of MPEG, known as Motion JPEG, or M-JPEG, does not use interframe coding and is thus easier to edit in a nonlinear editing system than full MPEG. MPEG-1 uses bandwidth from 500 Kbps to 4 Mbps, averaging about 1.25 Mbps. MPEG-2 uses from 4 to 16 Mbps.

What is claimed is:

1. A method for moving pictures experts group (MPEG) variable bit rate (VBR) video traffic classification using a nearest neighbor classifier, comprising:

determining I, P and B frame sizes for an input MPEG VBR video sequence;

computing mean values of said I, P and B frame sizes; and classifying said input video sequence into one of a plurality of categories based on said computed mean values using a nearest neighbor classifier.

2. The method of claim 1, wherein said classifying step comprises computing a Euclidean distance between said mean values of said I, P and B frame sizes of said input video sequence and mean values of I, P and B frame sizes of a training video sequence.

3. The method of claim 1, wherein said classifying step comprises using a K nearest neighbor classifier.

4. The method of claim 3, wherein said classifying step comprises using a K nearest neighbor classifier with K=3.

5. The method of claim 2, wherein said computing step comprises determining said training sequence based on in-product and out-of-product training.

6. The method of claim 1, wherein said classifying step comprises providing as said categories first and second categories; and classifying said input video sequence as one of said first and second categories.

7. The method of claim 6, wherein said providing step comprises providing as said first and second categories movies and sports categories.

8. A computer-readable medium carrying one or more sequences of one or more instructions for moving pictures experts group (MPEG) variable bit rate (VBR) video traffic classification using a nearest neighbor classifier, the one or more sequences of one or more instructions including instructions which, when executed by one or more processors, cause the one or more processors to perform the steps recited in any one of claims 1–7.

9. A communications system configured to include moving pictures experts group (MPEG) variable bit rate (VBR) video traffic classification using a nearest neighbor classifier, comprising:

a device configured to determine I, P and B frame sizes for an input MPEG VBR video sequence;

said device configured to compute mean values of said I, P and B frame sizes; and said device configured to classify said input video sequence into one of a plurality of categories based on said computed mean values using a nearest neighbor classifier.

10. The system of claim 9, wherein said nearest neighbor classifier is configured to compute a Euclidean distance between said mean values of said I, P and B frame sizes of said input video sequence and mean values of I, P and B frame sizes of a training video sequence.

11. The system of claim 9, wherein said nearest neighbor classifier comprises a K nearest neighbor classifier.

12. The system of claim 11, wherein K=3.

13. The system of claim 10, wherein said training sequence is determined based on in-product and out-of-product training.

14. The system of claim 9, wherein said categories comprise first and second categories; and said device is configured to classify said input video sequence as one of said first and second categories.

15. The system of claim 14, wherein said first and second categories comprise movies and sports categories.

16. A communications system for moving pictures experts group (MPEG) variable bit rate (VBR) video traffic classification using a nearest neighbor classifier, comprising:

means for determining I, P and B frame sizes for an input MPEG VBR video sequence;

means for computing mean values of said I, P and B frame sizes; and means for classifying said input video sequence into one of a plurality of categories based on said computed mean values using a nearest neighbor classifier.

17. A communications device configured to include moving pictures experts group (MPEG) variable bit rate (VBR) video traffic classification using a nearest neighbor classifier, comprising:

said device configured to determine I, P and B frame sizes for an input MPEG VBR video sequence;

said device configured to compute mean values of said I, P and B frame sizes; and said device configured to classify said input video sequence into one of a plurality of categories based on said computed mean values using a nearest neighbor classifier.

18. The device of claim 17, wherein said nearest neighbor classifier is configured to compute a Euclidean distance between said mean values of said I, P and B frame sizes of said input video sequence and mean values of I, P and B frame sizes of a training video sequence.

19. The device of claim 17, wherein said nearest neighbor classifier comprises a K nearest neighbor classifier.

20. The device of claim 19, wherein K=3.

21. The device of claim 18, wherein said training sequence is determined based on in-product and out-of-product training.

22. The device of claim 17, wherein said categories comprise first and second categories; and said device is configured to classify said input video sequence as one of said first and second categories.

23. The device of claim 22, wherein said first and second categories comprise movies and sports categories.

24. A communications apparatus for moving pictures experts group (MPEG) variable bit rate (VBR) video traffic classification using a nearest neighbor classifier, comprising:

means for determining I, P and B frame sizes for an input MPEG VBR video sequence;

means for computing mean values of said I, P and B frame sizes; and means for classifying said input video sequence into one of a plurality of categories based on said computed mean values using a nearest neighbor classifier.

* * * * *